US009085452B2

(12) United States Patent
Hoffmann

(10) Patent No.: US 9,085,452 B2
(45) Date of Patent: Jul. 21, 2015

(54) CARBONATED WATER MANUFACTURING DEVICE

(75) Inventor: David Hoffmann, Hong Kong (CN)

(73) Assignee: Sodasparkle International Limited, Hong Kong (CN)

( * ) Notice: Subject to any disclaimer, the term of this patent is extended or adjusted under 35 U.S.C. 154(b) by 546 days.

(21) Appl. No.: 13/492,925

(22) Filed: Jun. 11, 2012

(65) Prior Publication Data

US 2013/0113124 A1     May 9, 2013

(30) Foreign Application Priority Data

Nov. 3, 2011 (CN) ...................... 2011 2 0430864 U

(51) Int. Cl.
| | | |
|---|---|---|
| *B01F 3/04* | (2006.01) | |
| *B67D 1/04* | (2006.01) | |
| *A23L 2/54* | (2006.01) | |

(52) U.S. Cl.
CPC ................. *B67D 1/0418* (2013.01); *A23L 2/54* (2013.01); *B01F 3/04801* (2013.01)

(58) Field of Classification Search
CPC ...... A23L 2/54; B01F 3/04801; B67D 1/0418
USPC .............. 261/65, 77, 121.1, DIG. 7; 426/477; 99/323.1, 323.2
See application file for complete search history.

(56) References Cited

U.S. PATENT DOCUMENTS

| | | | | |
|---|---|---|---|---|
| 4,316,409 | A * | 2/1982 | Adams et al. ................... | 99/275 |
| 4,457,877 | A * | 7/1984 | Love et al. .................... | 261/64.3 |
| 4,679,602 | A * | 7/1987 | Hollis et al. .................... | 141/19 |
| 4,867,209 | A * | 9/1989 | Santoiemmo .................. | 141/19 |
| 4,934,543 | A * | 6/1990 | Schmidt ........................ | 215/228 |
| 5,329,975 | A * | 7/1994 | Heitel ............................ | 141/19 |
| 2014/0272052 | A1 * | 9/2014 | Bueno ........................... | 426/477 |

* cited by examiner

*Primary Examiner* — Charles Bushey

(57) ABSTRACT

A carbonated water manufacturing device, including a sleeve and a bottle cap which are mutually independent, wherein the sleeve includes a sleeve body and a plug body inside the sleeve; the sleeve body and the plug body are provided with a first through-hole and a second through-hole at their side surfaces, respectively; the bottle cap is provided with a perforated through-hole whose bottom is connected with an injection tube; the upper part of the bottle cap is fittingly connected with the lower part of the plug part; the opening at the lower part of the sleeve body is fittingly connected with the lower part of the outer edge of the bottle cap, and the top of the sleeve body acts on the carbon dioxide housing body in the sleeve body; the connection of the lower part of the bottle cap and the injection tube is provided with a check valve.

14 Claims, 4 Drawing Sheets

CARBONATED WATER MANUFACTURING DEVICE

BACKGROUND OF THE PRESENT INVENTION

1. Field of Invention

The present invention relates to a device, and, more specifically especially, to a carbonated water manufacturing device.

2. Description of Related Arts

A carbonated water manufacturing device is a device capable of generating sufficient mechanical pressure to penetrate the bottom of a housing body containing carbon dioxide ($CO_2$) and inject $CO_2$ into the bottle containing water, thus mixing the water in the bottle with $CO_2$ and therefore producing carbonated drinks, namely the carbonated water.

The carbonated water manufacturing device in the prior art includes an upper part and a lower part, wherein both the upper and lower parts are of hollow structure, the upper part has a sealed top surface and an opening at its lower portion, the upper end of the lower part whose upper and lower ends communicate with each other is connected with the opening at the lower portion of the upper part, and the lower end of the lower part is connected closely with the bottle. A housing body containing $CO_2$ is sleeved in the upper part of the carbonated water manufacturing device. The top of the upper part acts on the housing body containing $CO_2$, and when the pressure increases, the bottom of the housing body containing $CO_2$ is penetrated and the $CO_2$ inside will be injected into the bottle containing water through the pipe at the connection of the upper and lower parts.

However, the carbonated water manufacturing device in the prior art has at least the following defects: firstly, after $CO_2$ is injected into the bottle to generate carbonated water, the whole carbonated water manufacturing device is taken away from the bottle. Therefore, the carbonated water shall be consumed in a short period of time to avoid deteriorating, which is not conducive to the storage of the generated carbonated water; secondly, if the housing body containing $CO_2$ cannot be fixed firmly when being penetrated, and the inlet used to mount the housing body containing $CO_2$ has not been locked closely and can be opened, serious hazards may be generated, which will cause injuries to the user.

SUMMARY OF THE PRESENT INVENTION

The present invention provides a carbonated water manufacturing device with a unique structure capable of overcoming the problems existent in the prior art.

A carbonated water manufacturing device provided by the present invention includes a sleeve and a bottle cap which are mutually independent;

the sleeve includes a sleeve body and a plug body inside the sleeve;

the sleeve body is a hollow structure with a sealed top, an opening at its lower part and a first through-hole at its side surface;

the plug body is a pipe whose upper and lower ends communicate with each other and it has a second through-hole at its side surface, wherein the second through-hole perforates the hollow part of the plug body;

the bottle cap is provided with a perforated through-hole, wherein the through-hole is configured with a needle having a hole at its upper part and an injection tube at its bottom; a check valve is configured at the connection of the lower part of the bottle cap and the injection tube; the upper part is fittingly connected with the lower part of the plug body;

the opening at the lower part of the sleeve body is fittingly connected with the lower part of the outer edge of the bottle cap, and the top of the sleeve body acts on the carbon dioxide housing body in the sleeve.

Wherein the carbonated water manufacturing device also includes an open lock ring with two bulges at the opening of the lock ring, and the outer diameter of the open lock ring is the same with that of the plug body; the plug body is also provided with a transverse slot, the lock ring is fastened in the transverse slot of the plug, and the two bulges are located at the mouth of the second through-hole.

Wherein the lower part of the bottle cap is configured with a unidirectional flow-back hole which is located on the side where the lower part of the bottle cap connects with the injection tube;

A spring and a terminal connected with the spring are disposed at the place near the through-hole of the bottle cap top, which corresponds to the unidirectional flow-back hole.

Wherein the side surface of the plug body is provided with a button, the side surface of the sleeve body is provided with a third through-hole, and the button perforates the third through-hole.

Wherein the plug body is provided with several protrusions at the bottom, the bottle cap is provided with several slots on the top, and the protrusions are fittingly connected with the slots.

Wherein the plug body is provided with several slots at the bottom, the bottle cap is provided with several protrusions on the top, and the protrusions are fittingly connected with the slots.

Wherein the shapes of the first and second through-holes are the same as that of the carbon dioxide housing body disposed in the sleeve through the first and second through-holes, and the sizes of the first and second through-holes are a little larger than that of the carbon dioxide housing body.

Wherein the sleeve body and the plug body are provided with a fourth through-hole and a fifth through-hole, respectively, and the sizes of the fourth and fifth through-holes are smaller than those of the first and second through-holes, as well as those of the carbon dioxide housing body.

Wherein the opening at the lower part of the sleeve body and the lower part of the bottle cap are configured with internal and external threads, respectively, and the internal threads of the sleeve body are fittingly connected with the external threads of the bottle cap; or the opening at the lower part of the sleeve body and the lower part of the bottle cap are configured with external and internal threads, respectively, and the internal threads of the sleeve body are fittingly connected with the external threads of the bottle cap.

Wherein the bottom of the bottle cap is provided with internal threads on the inner side which are fittingly connected with the external threads at the bottle mouth; or the bottom of the bottle cap is provided with external threads at the inner side which are fittingly connected with the internal threads at the bottle mouth.

The bottom of the bottle cap is also provided with external threads used to be fittingly connected with the internal threads at the bottle mouth.

When implementing the present invention, after the carbonated water manufacturing device injects $CO_2$ into the bottle connected with it, take away the sleeve of the carbonated water manufacturing device so the bottle cap part can seal the bottle, thus realizing long-term storage; by using the carbonated water manufacturing device to act on the carbon dioxide housing body, when manufacturing carbonated water, the plug body does not rotate when the sleeve is tightened to the bottle cap; only the sleeve body rotates and all the through-holes on the sleeve body and plug body are closed, so the carbon dioxide housing body is in the sleeve when being penetrated, which is secure and will not cause personal injury.

BRIEF DESCRIPTION OF THE DRAWINGS

In order to illustrate the technical solutions of the present invention or the prior art more clearly, the accompanying drawings used in the description of embodiments or the prior art will be explained briefly hereinafter. It is obvious that the accompanying drawings in the following description are only for some embodiments of the present invention. For the common technical personnel skilled in this art, other drawings can be obtained according to the accompanying drawings without any creative work.

DETAILED DESCRIPTION OF THE PREFERRED EMBODIMENT

A carbonated water manufacturing device provided by the present invention is used to be installed on the bottle containing water and penetrate the bottom of the carbon dioxide housing body containing CO2, thus injecting CO2 into the bottle containing water and further turning the water into carbonated water. The carbonated water manufacturing device provided by the present invention with a unique structure is capable of leaving its bottle cap part on the bottle after being taken away from the bottle when the carbonated water is generated and keeping a relatively sealed condition, thus making sure the carbonated water in the bottle is good quality. Moreover, when the carbonated water manufacturing device penetrates the carbon dioxide housing body and injects CO2 into the bottle containing water, all the through-holes on the sleeve body and plug body are closed, and the carbon dioxide housing body is stable, so the carbonated water manufacturing device is secure and reliable, which will not cause personal injury.

The structure and functions of the carbonated water manufacturing device provided by the present invention will be illustrated hereinafter in detail in combination with the accompanying drawings. It shall be noted that the carbonated water manufacturing device provided by the present invention includes neither the carbon dioxide housing body in it nor the bottle connected with it. However, the through-holes on the sleeve of the carbonated water manufacturing device provided by the present invention can be designed of the shape and size fit for those of the carbon dioxide housing body, and the bottle cap can also be designed of the shape and size fit for different bottles.

Figure 1:
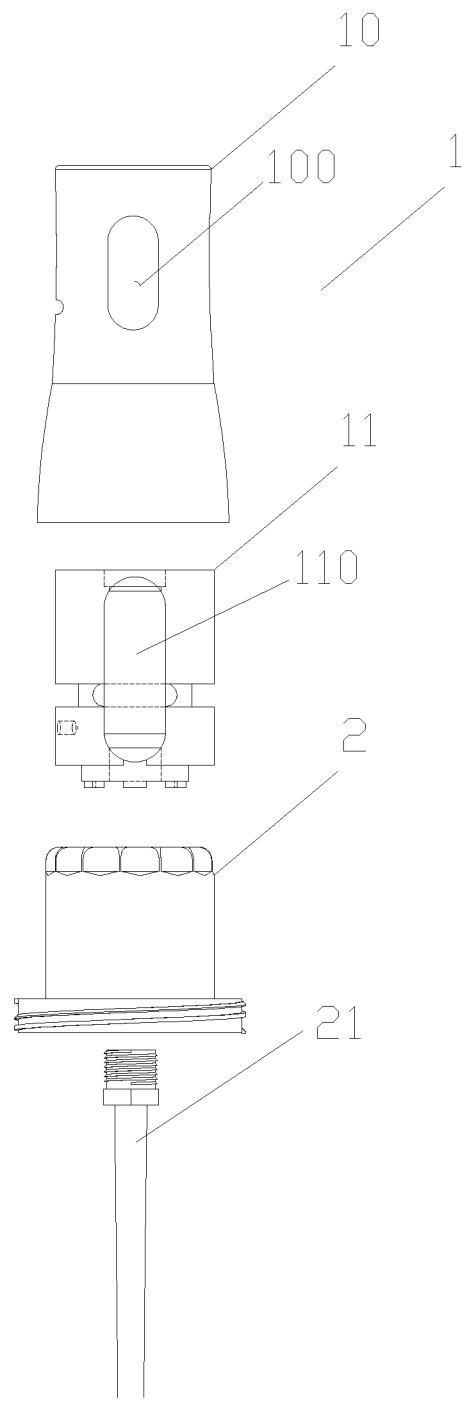
FIG. 1 is the structural diagram of Embodiment 1 of the carbonated water manufacturing device provided by the present invention.

FIG. 1 is the structural diagram of Embodiment 1 of the carbonated water manufacturing device provided by the present invention.

The carbonated water manufacturing device provided by Embodiment 1 includes:

a sleeve 1 and a bottle cap 2 which are mutually independent;

the sleeve 1 includes a sleeve body 10 and a plug 11 inside the sleeve;

the sleeve body 10 is of hollow structure with a sealed top, an opening at its lower part and a first through-hole 100 at its side surface 10;

the plug body 11 is a pipe whose upper and lower ends communicate with each other and its has a second through-hole 110 at its side surface, wherein the second through-hole 110 is communicated with the hollow part of the plug body 11;

the bottle cap 2 is provided with a perforated through-hole with a needle at its upper part, wherein the needle has a hole and is used to penetrate the carbon dioxide housing body when the sleeve body 10 of the sleeve 1 is tightened with the bottle cap 2; the bottle cap 2 is connected with an injection tube 21 at its bottom; a check valve is disposed at the connection of the lower part of the bottle cap and the injection tube 21; and the bottle cap 2 is fittingly connected with the lower part of the plug body 11;

the opening at the lower part of the sleeve body 11 is fittingly connected with the lower part of the outer edge of the bottle cap 2, and the top of the sleeve body 11 acts on the carbon dioxide housing body in the sleeve 1(FIG. 1 doesn't show the carbon dioxide housing body).

When manufacturing carbonated water using the carbonated water manufacturing device provided by the present invention, the plug body 11 is inserted in the sleeve body 10. Before the sleeve body 10 and the bottle cap 2 are tightened to each other, the plug body 11 is not fixed in the sleeve body 10. When they are tightened to each other, the lower part of the plug body 11 is fittingly connected with the upper part of the bottle cap 2 closely, so the plug body 11 cannot rotate; only the sleeve body 10 can rotate. The top of the sleeve body 10 acts on and penetrates the carbon dioxide housing body, the CO2 in the housing body is pressed into the bottle connected with the carbonated water manufacturing device by means of the through-hole 20 on the top of the bottle cap 2, and the injection tube 20 connected with its lower part. Thus, the CO2 is mixed with the water in the bottle, and the water becomes carbonated water. Thus the carbonated water manufacturing device provided by the present invention completes the process of manufacturing carbonated water.

Since the sleeve 1 and the bottle cap 2 of the carbonated water manufacturing device provided by Embodiment 1 of the present invention are mutually independent, the sleeve 1 can be loosened from the bottle cap 2 easily after the manufacturing of carbonated water is completed. As the through-hole 20 (see FIG. 7) on the bottle cap 2 is small, and the injection tube 21 at the bottom of the bottle cap 2 is fine, a check valve is disposed at the connection of the lower part of the bottle cap 2 and the injection tube 21. The configuration of the check valve makes the water in the bottle unable to flow back to the bottle cap 2 through the injection tube 21, so the bottle cap 2 and the bottle are sealed with each other. Therefore, the carbonated water in the bottle can be stored for a long period of time without deterioration, which increases the convenience of the carbonated water manufacturing device and helps to avoid the waste caused by the carbonated water manufactured by the carbonated water manufacturing device in the prior art being requiring to be used in a short period of time.

Furthermore, when manufacturing carbonated water by using the carbonated water manufacturing device, the sleeve body 10 of the sleeve 1 is tightened with the bottle cap 2 and the lower part of the plug body 11 is fittingly connected with the upper part of the bottle cap 2, so the plug body 11 cannot rotate; only the sleeve body 10 can rotate. While the first through-hole 100 and other through-holes on the sleeve body 10 are covered by the solid part of the plug body 11, the carbon dioxide housing body can never be taken out during manufacturing; even when the carbon dioxide housing body ruptures, it will not be ejected from the sleeve 1 since the through-holes on the sleeve body 10 of the sleeve 1 are covered by the solid part of the plug body 11. Therefore, user will not be hurt.

Another technical problem addressed by the carbonated water manufacturing device provided by the present invention is to fix the carbon dioxide housing body relatively when it is penetrated, so as to avoid the safety problems caused by the explosion of the carbon dioxide housing body.

Figure 2:
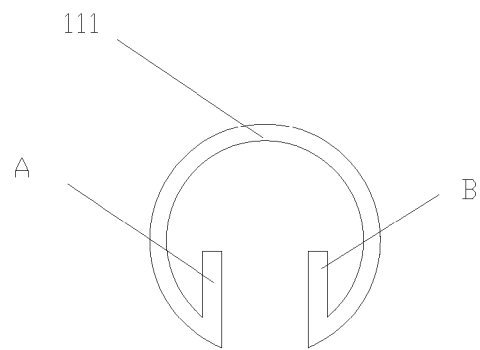
FIG. 2 is the top view of the lock ring of the carbonated water manufacturing device provided by the present invention.

To solve this technical problem, the carbonated water manufacturing device provided by the present invention also includes a lock ring. See FIG. 2 for details. FIG. 2 is the top view of the lock ring of the carbonated water manufacturing device provided by the present invention.

Figure 3:
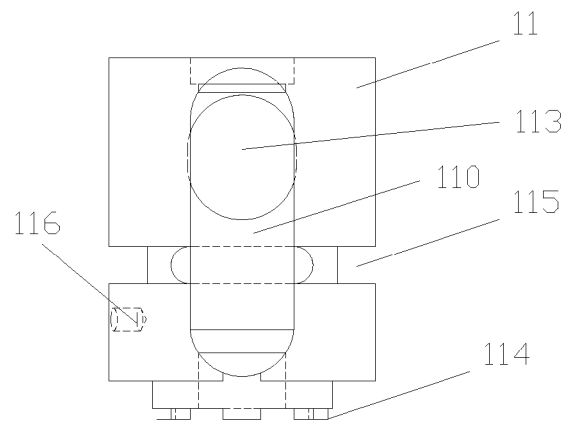
FIG. 3 is the structural diagram of plug body of the sleeve of the carbonated water manufacturing device provided by the present invention.

The lock ring 111 of the carbonated water manufacturing device is of open type, wherein two bulges A and B are configured at the opening of the lock ring, and the outer diameter of the lock ring 111 is the same as that of the plug body 11;

correspondingly, as shown in FIG. 3, the plug body 11 is provided with a transverse slot 115 in the transverse direction, the lock ring 111 is fastened closely in the transverse slot 115 in the transverse direction of the plug body 11, and the two bulges A and B are located at the mouth of the second through-hole 110 of the plug body 11.

The lock ring 111 is disposed on the transverse slot 115 at the periphery of the plug body 11 when the manufacturing of carbonated water begins. During the process of manufacturing carbonated water by using the carbonated water manufacturing device, the carbon dioxide housing body 3 is wedged into the lock ring 111 through the opening of the lock ring 111. During the process of manufacturing carbonated water, the lock ring 111 can keep the carbon dioxide housing body 3 stable when the sleeve body 10 of the sleeve 1 is tightened with the bottle cap 2, thus not allowing the carbon dioxide housing body to vibrate when being tightened. The housing body containing carbon dioxide will explode if it is caused to vibrate violently when being packaged, causing personal injury. Using the carbonated water manufacturing device of the present invention can ideally avoid the potential hazards.

When manufacturing carbonated water, redundant gas will be generated in the bottle after CO2 is injected. Since the connection of the bottle cap 2 and the bottle is relatively sealed, the pressure in the bottle is high in this case. It may not be high enough to explode, but is still potentially dangerous.

Figure 4:
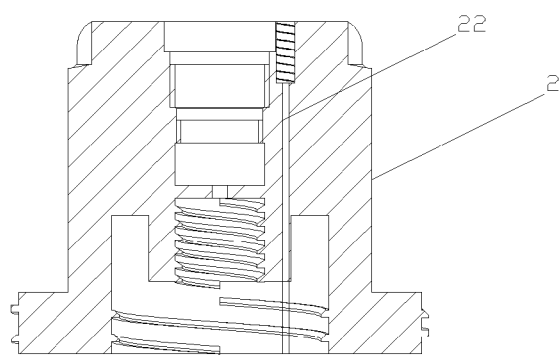
FIG. 4 is the vertical sectional view of the bottle cap of the carbonated water manufacturing device provided by the present invention.

To solve this technical problem, the carbonated water manufacturing device provided by the present invention has a specially designed bottle cap. See FIG. 4 for details. FIG. 4 is the vertical sectional view of the bottle cap of the carbonated water manufacturing device provided by the present invention.

A unidirectional flow-back hole 22 is configured at the lower part of the bottle cap 2 provided by the embodiment, wherein the unidirectional flow-back hole 22 is located on the side where the lower part of the bottle cap is connected with the injection tube 21.

A spring and a terminal connected with the spring are disposed at the place near the through-hole of the bottle cap 2 top, which corresponds to the unidirectional flow-back hole. When the pressure in the bottle is normal, the spring above the unidirectional flow-back hole 22 is loosened, and the terminal connected with it plugs the unidirectional flow-back hole 22; when the pressure in the bottle is high, the spring above the unidirectional flow-back hole 22 is compacted tightly, and the terminal connected with it is retract, which will not plug the unidirectional flow-back hole 22. Thus, the gas in the bottle is emitted through the unidirectional flow-back hole 22. The specially designed structure can ensure that the pressure in the bottle is in a stable state, avoiding the potential hazards when manufacturing carbonated water.

Figure 5:
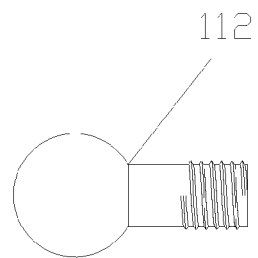
FIG. 5 is the schematic diagram of the button of the carbonated water manufacturing device provided by the present invention.
Figure 6:
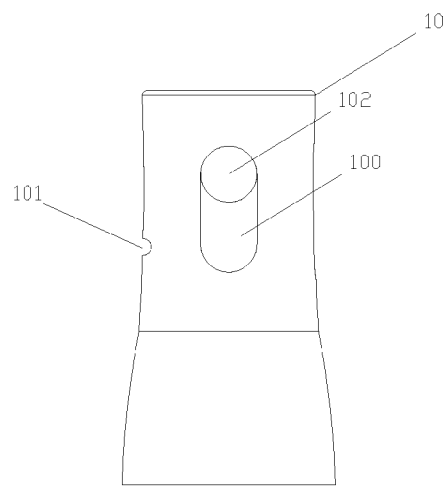
FIG. 6 is the structural diagram of sleeve body of the sleeve of the carbonated water manufacturing device provided by the present invention.

After the manufacturing of carbonated water is completed using the carbonated water manufacturing device provided by the present invention, for the convenience of taking the carbon dioxide housing body 3 out from the sleeve 1, the present invention has made the following designs, see FIGS. 5 and 6 for details;

FIG. 5 is the schematic diagram of the button of the carbonated water manufacturing device provided by the present invention.

FIG. 6 is the structural diagram of sleeve body of the sleeve of the carbonated water manufacturing device provided by the present invention.

Refer to FIG. 3 again. As shown in FIG. 3, the plug body 11 is provided with a small hole 116 at its side surface, as shown in FIG. 6, and the sleeve body 10 is provided with a third through-hole 101 at its side surface in the transverse direction.

One end of the button 112 is a global handle, and the other end is provided with threads. The button 112 perforates the third through-hole 101, and its global handle is exposed outside the sleeve body 10; when the other end is screwed into the small hole 116 of the plug body 11, it is fastened with the plug body 11.

When manufacturing carbonated water using the carbonated water manufacturing device provided by the present invention, the first through-hole 100 of the sleeve body 10 of the sleeve 1 coincides with the second through-hole 110 of the plug body 11. Moreover, the shapes of the first through-hole 100 and the second through-hole 110 are the same as that of the carbon dioxide housing body 3 disposed in the sleeve 1 through the first and second through-holes 100 and 110, and the sizes of the first and second through-holes 100 and 110 are a little larger than that of the carbon dioxide housing body 3, which is convenient for the carbon dioxide housing body 3 to go through the first and second through-holes 100 and 110 to be plugged into the hollow part of the plug body 11.

However, during the manufacturing of carbonated water, when the sleeve body 10 of the sleeve 1 is tightened with the bottle cap 2, the relative positions of the plug body 11 and sleeve body 10 of the sleeve 1 change, so the first through-hole 100 of the sleeve body 10 and the second through-hole 110 of the plug body 11 cannot coincide with each other.

Therefore, after the manufacturing of carbonated water is completed, the plug body 11 shall be adjusted to the original position to let the second through-hole 110 on the plug body 11 coincide with the first through-hole 100 on the sleeve body 10 for the convenience of taking out the carbon dioxide housing body 4. Therefore, the button 112 of the carbonated water manufacturing device provided by the present invention can move in the third through-hole 101 on the sleeve body 10 along the transverse direction and lead the plug body 11 to rotate until the second through-hole 110 of the plug body 11 coincides with the first through-hole 100 of the sleeve body 10. Thus, the carbon dioxide housing body 3 can be taken out.

For the convenience of taking out the carbon dioxide housing body 3, as shown in FIG. 6, the sleeve body 10 of the present invention is provided with a fourth through-hole 102. As shown in FIG. 3, the plug body 11 is provided a fifth through-hole 113, the fourth and fifth through-holes 102 and 113 coincide with each other when the first and second through-holes 100 and 110 coincide with each other, and their sizes are smaller than the first and second through-holes 100 and 110, as well as that of the carbon dioxide housing body 3.

The fourth and fifth through-holes 102 and 113 are configured for the convenience of taking the carbon dioxide housing body 3 in the plug body 11 out from the first and second through-holes 100 and 110 coinciding with each other by putting fingers into them.

In the preferred embodiments, the fourth and fifth through-holes 102 and 113 are round. It is certain that they can be other shapes convenient for putting fingers into them, but they may be no greater than the carbon dioxide housing body 3 so that the carbon dioxide housing body 3 will not drop from the fourth and fifth through-holes 102 and 113.

It shall be noted that there are various methods for fittingly connecting the sleeve body 10 of the sleeve 1 with the bottle cap 2 of the carbonated water manufacturing device provided by the present invention. A typical method is that the opening at the lower part of the sleeve body 10 and the lower part of the outer edge of the bottle cap 2 are provided with internal and external threads, respectively, wherein the internal and external threads are fittingly connected with each other. This configuration method enables the top of the sleeve body 10 to act on the carbon dioxide housing body 3 when the sleeve body 10 is forcefully tightened with the bottle cap 2. Of course, the lower part of the outer edge of the bottle cap 2 and the opening at the lower part of the sleeve body 10 can also be provided with internal and external threads, respectively, to realize the same fitting connection and fastening.

Figure 7:
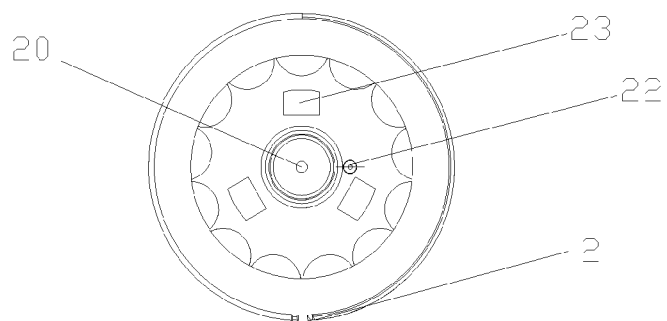
FIG. 7 is the schematic diagram of the top of the bottle cap of the carbonated water manufacturing device provided by the present invention.

When the sleeve body 10 is fittingly connected with the bottle cap 2 through the external and internal threads, the plug body 11 will contact the top of the bottle cap 2. In order to finally make them be fittingly connected with each other, as shown in FIG. 3, the plug body 11 is provided with several protrusions 114 at its bottom; as shown in FIG. 7, the bottle cap 2 is provided with several slots 23 on the top, wherein the protrusions 114 are fittingly connected with the slots 23.

Of course, as another realization method, the plug body 11 can be provided with several slots at the bottom, and the bottle cap 2 can be provided with several protrusions on the top, wherein the several protrusions are fittingly connected with the slots.

Figure 8:
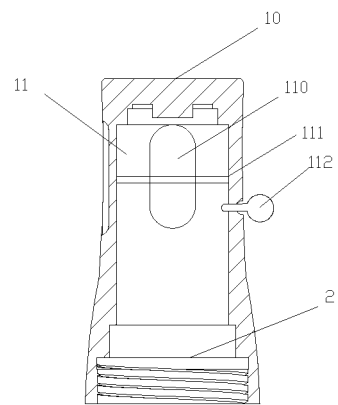
FIG. 8 is the vertical sectional view of Embodiment 2 of the carbonated water manufacturing device provided by the present invention.

FIG. 8 is the structural diagram of Embodiment 2 of the carbonated water manufacturing device provided by the present invention.

Figure 9:
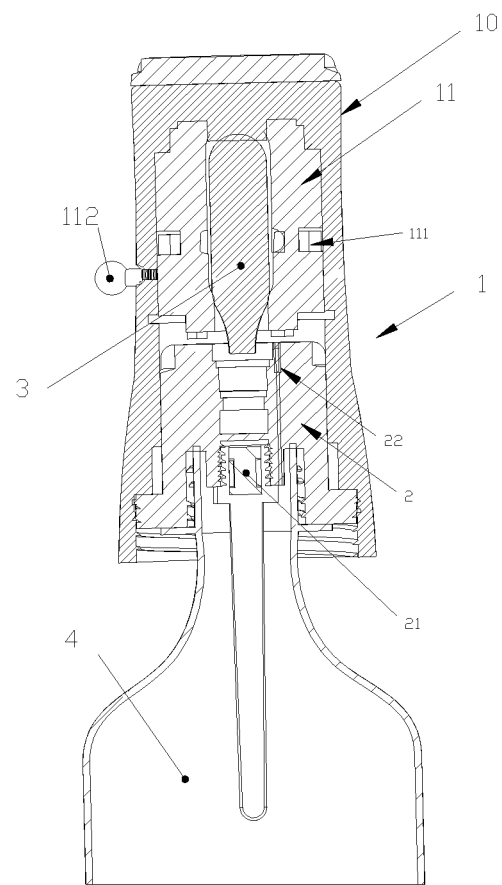
FIG. 9 is the installation diagram of Embodiment 2 of the carbonated water manufacturing device provided by the present invention.

FIG. 9 is the structural diagram of Embodiment 2 of the carbonated water manufacturing device provided by the present invention.

As shown in FIG. 8 and FIG. 9, when manufacturing carbonated water using the carbonated water manufacturing device provided by the present invention, the carbonated water manufacturing device is fittingly connected with the bottle 4 in a way of thread connection as mentioned above. The carbon dioxide housing body 3 is plugged into the sleeve 1 through the first through-hole 100 of the sleeve body 10 and the second through-hole 110 of the plug body 11.

The plug body 11 is inserted in the sleeve body 10. Before the sleeve body 10 and the bottle cap 2 are tightened with each other, the plug body 11 is not fixed in the sleeve body 10. When they are tightened to each other, the lower part of the plug body 11 is closely and fittingly connected with the upper part of the bottle cap 2. Thus, the plug body 11 cannot rotate, and only the sleeve body 10 can rotate. The top of the sleeve body 10 acts on and penetrates the carbon dioxide housing body 3, the $CO_2$ in the housing body is pressed into the bottle connected with the carbonated water manufacturing device by means of the through-hole 20 on the top of the bottle cap 2 and the injection tube 21 connected with its lower part. Thus, the $CO_2$ is mixed with the water in the bottle, and the water becomes carbonated water.

When manufacturing carbonated water using the carbonated water manufacturing device provided by Embodiment 2 of the present invention, the sleeve body 10 of the sleeve 1 is tightened to the bottle cap 2, and the lower part of the plug body 11 is fittingly connected with the upper part of the bottle cap 2. Thus, the plug body 11 cannot rotate, and only the sleeve body 10 can rotate. The carbon dioxide housing body cannot be taken out during manufacturing while the first, third and fourth through-holes 100, 101 and 102 (as shown in FIG. 6) will be covered by the solid part of the plug body 11; even when the carbon dioxide housing body 3 ruptures, it will not be ejected from the sleeve 1, since the through-holes on the sleeve body 10 of the sleeve 1 are covered by the solid part of the plug body 11. thus, the user will not be hurt. Moreover, since the configured lock ring 111 locks the carbon dioxide housing body 3 in the plug body 11, the carbon dioxide housing body 3 is in a relatively stable state when manufacturing carbonated water, thus eliminating the possibility of explosion and getting it out of the sleeve 1.

It shall be noted that the present invention describes a product form of the carbonated water manufacturing device, other products meeting the structure described by the present invention are within the scope of protection of the present invention, even if some factors, such as material, element name, appearance and element layout sequences, which have no influence on the product characteristics, are different.

The description above is to further illustrate the present invention in combination with the preferred embodiments rather than to limit the specific implementation of the present invention. For the common technical personnel skilled in the art of the present invention, some simple extrapolations and alternations can be made, which should be covered in the scope of protection of the present invention.

What is claimed is:
1. A carbonated water manufacturing device, wherein it includes: a sleeve and a bottle cap which are mutually independent;
   the sleeve includes a sleeve body and a plug body inside the sleeve;
   the sleeve body is of a hollow structure with a sealed top, an opening at its lower part and a first through-hole at its side surface;
   the plug body is a pipe whose upper and lower ends communicate with each other and has a second through-hole at its side surface, wherein the second through-hole is communicated with the hollow part of the plug body;

the bottle cap is provided with a perforated through-hole, wherein the through-hole is configured with a needle having a hole at its upper part and an injection tube at its bottom; a check valve is configured at the connection of a lower part of a bottle cover and the injection tube; the upper part is fittingly connected with the lower part of the plug body;

the opening at the lower part of the sleeve body is fittingly connected with a lower part of an outer edge of the bottle cover, and the top of the sleeve acts on a carbon dioxide housing body in the sleeve.

2. The carbonated water manufacturing device according to claim 1, wherein the carbonated water manufacturing device also includes an open lock ring with two bulges at the opening of the lock ring, and the outer diameter of the opening lock ring is the same with that of the plug body; the plug body is also provided with a transverse slot, the lock ring is fastened in the transverse slot of the plug and the two bulges are located at the mouth of the second through-hole.

3. The carbonated water manufacturing device according to claim 2, wherein the bottle cap is provided with a unidirectional flow-back hole at its lower part, wherein the unidirectional flow-back hole is located at the side on which the lower part of the bottle cap is connected with the injection tube;

a spring and a terminal connected with the spring are disposed at the place near a through-hole of a bottle cover top, which corresponds to the unidirectional flow-back hole.

4. The carbonated water manufacturing device according to claim 3, wherein the plug body is provided with a button at its side surface, the sleeve body is provided with a third through-hole at its side surface in the transverse direction, and the button perforates the third through-hole.

5. The carbonated water manufacturing device according to claim 4, wherein the plug body is provided with several protrusions at the bottom, the bottle cap is provided with several slots on the top, and the protrusions are fittingly connected with the slots.

6. The carbonated water manufacturing device according to claim 4, wherein the plug body is provided with several slots at the bottom, the bottle cap is provided with several protrusions on the top, and the protrusions are fittingly connected with the slots.

7. The carbonated water manufacturing device according to claim 5, wherein the shapes of the first and second through-holes are the same as that of the carbon dioxide housing body disposed in the sleeve through the first and second through-holes, and the sizes of the first and second through-holes are a little larger than that of the carbon dioxide housing body.

8. The carbonated water manufacturing device according to claim 6, wherein the shapes of the first and second through-holes are the same as that of the carbon dioxide housing body disposed in the sleeve through the first and second through-holes, and the sizes of the first and second through-holes are a little larger than that of the carbon dioxide housing body.

9. The carbonated water manufacturing device according to claim 7, wherein the sleeve body and the plug body are provided with a fourth through-hole and a fifth through-hole, respectively, and the sizes of the fourth and fifth through-holes are smaller than those of the first and second through-holes, as well as that of the carbon dioxide housing body.

10. The carbonated water manufacturing device according to claim 8, wherein the sleeve body and the plug body are provided with a fourth through-hole and a fifth through-hole, respectively, and the sizes of the fourth and fifth through-holes are smaller than those of the first and second through-holes, as well as that of the carbon dioxide housing body.

11. The carbonated water manufacturing device according to claim 9, wherein the opening at the lower part of the sleeve body is provided with internal threads, the lower part of the bottle cap is provided with external threads, and the internal threads of the sleeve body are fittingly connected with the external threads of the bottle cap.

12. The carbonated water manufacturing device according to claim 10, wherein the opening at the lower part of the sleeve body is provided with internal threads, the lower part of the bottle cap is provided with external threads, and the internal threads of the sleeve body are fittingly connected with the external threads of the bottle cap.

13. The carbonated water manufacturing device according to claim 11, wherein the bottom of the bottle cap is provided with internal threads on the inner side which are fittingly connected with the external threads at the bottle mouth.

14. The carbonated water manufacturing device according to claim 12, wherein the bottom of the bottle cap is provided with internal threads on the inner side which are fittingly connected with the external threads at the bottle mouth.

* * * * *